(12) United States Patent
Igaki et al.

(10) Patent No.: US 7,358,865 B2
(45) Date of Patent: Apr. 15, 2008

(54) OPTICAL ENCODER AND APPARATUS USING OPTICAL ENCODER

(75) Inventors: Masahiko Igaki, Yokohama (JP); Akio Atsuta, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/467,690

(22) Filed: Aug. 28, 2006

(65) Prior Publication Data

US 2007/0047050 A1     Mar. 1, 2007

(30) Foreign Application Priority Data

Aug. 29, 2005   (JP) .............................. 2005-247669

(51) Int. Cl.
    *H03M 1/22*   (2006.01)
(52) U.S. Cl. ..................... 341/13; 341/11; 250/231.13; 250/231.14; 250/233; 250/237 G
(58) Field of Classification Search ..................... None
    See application file for complete search history.

(56) References Cited

U.S. PATENT DOCUMENTS

| | | | |
|---|---|---|---|
| 4,987,302 A | 1/1991 | Meyer et al. | |
| 5,323,001 A | 6/1994 | Igaki et al. | |
| 5,621,527 A * | 4/1997 | Kaneda et al. | 356/499 |
| 5,661,296 A * | 8/1997 | Ishizuka et al. | 250/231.14 |
| 5,880,839 A * | 3/1999 | Ishizuka et al. | 356/499 |
| 5,909,283 A * | 6/1999 | Eselun | 356/499 |
| 6,803,560 B1* | 10/2004 | Okumura et al. | 250/231.16 |
| 7,265,336 B2* | 9/2007 | Hataguchi et al. | 250/231.13 |

FOREIGN PATENT DOCUMENTS

| | | |
|---|---|---|
| JP | 59-061711 A | 4/1984 |
| JP | 01-316610 A | 12/1989 |
| JP | 03-197819 A | 8/1991 |
| JP | 05-203465 A | 8/1993 |
| JP | 2005-164588 A | 6/2005 |

* cited by examiner

*Primary Examiner*—Khai M. Nguyen
(74) *Attorney, Agent, or Firm*—Canon U.S.A. Inc., IP Division

(57) ABSTRACT

An optical encoder includes a cylindrical reflective scale, a point light source for irradiating the reflective scale, and light-receiving elements for receiving the light beams reflected by the reflective scale. The pitch of the reflective scale is set to an appropriate value such that the pitch of interference fringes formed by light beams that are reflected by the reflective scale is matched to the pitch of the light-receiving elements at a position with a desired gap.

6 Claims, 16 Drawing Sheets

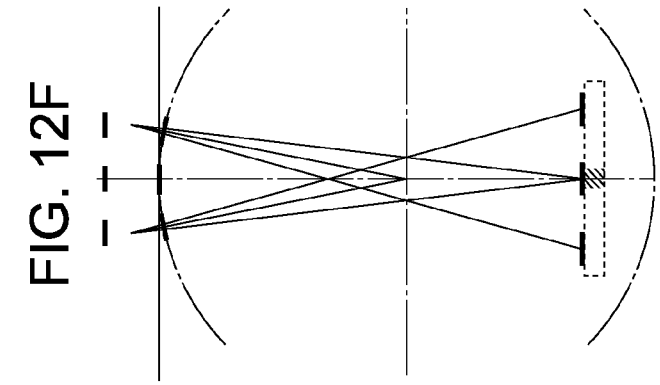
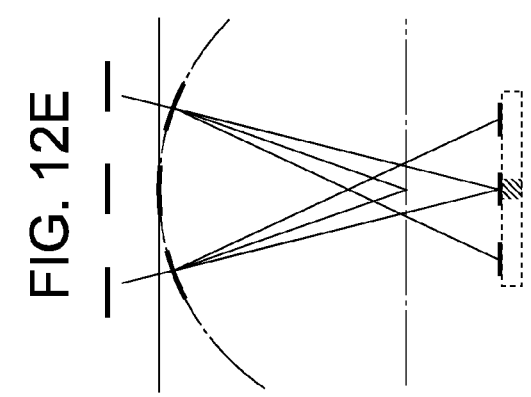
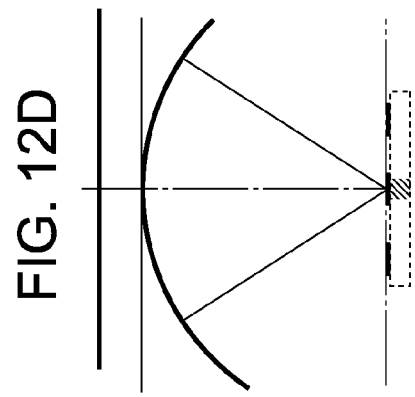
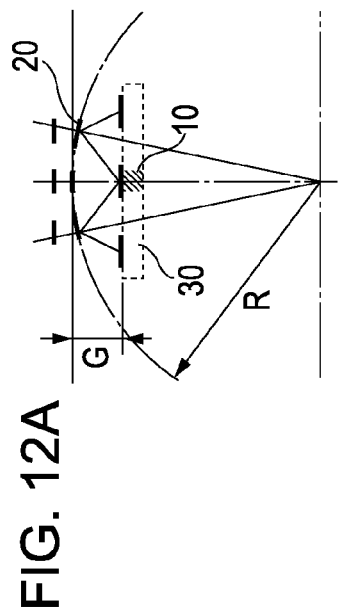
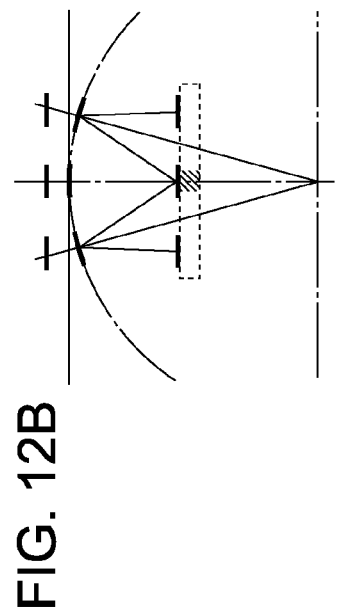
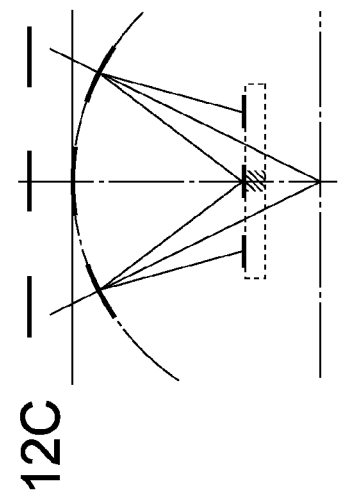

FIG. 15
PRIOR ART
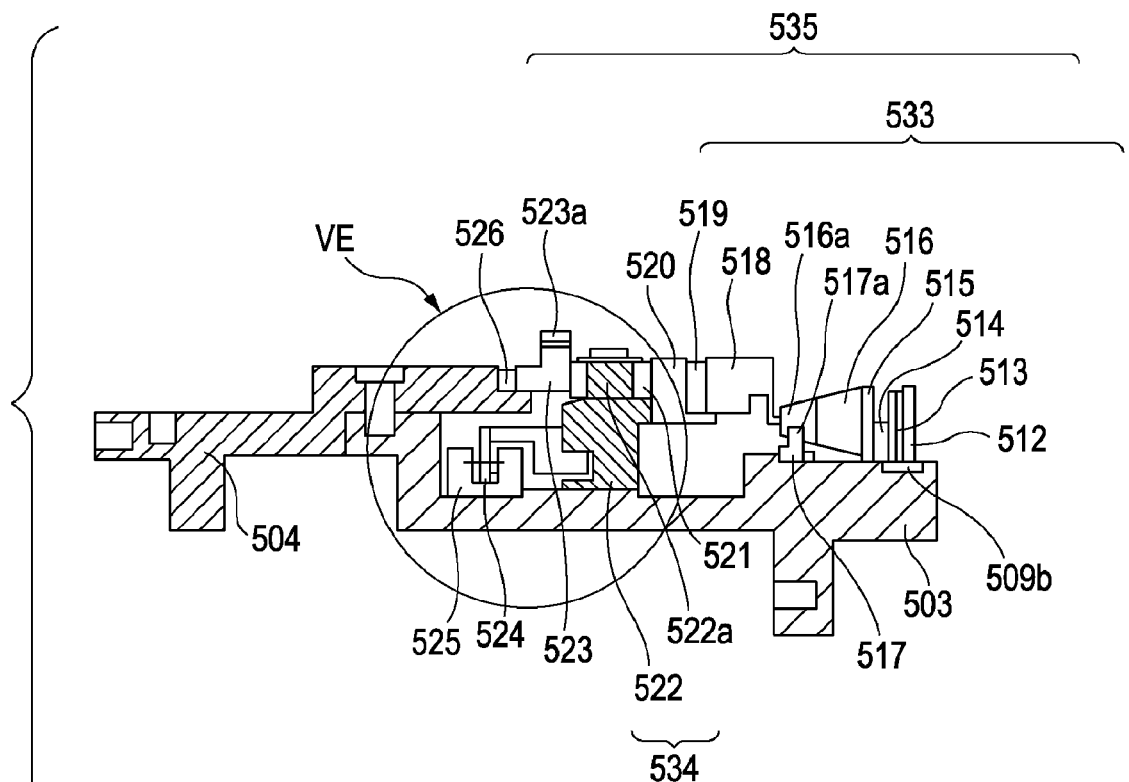
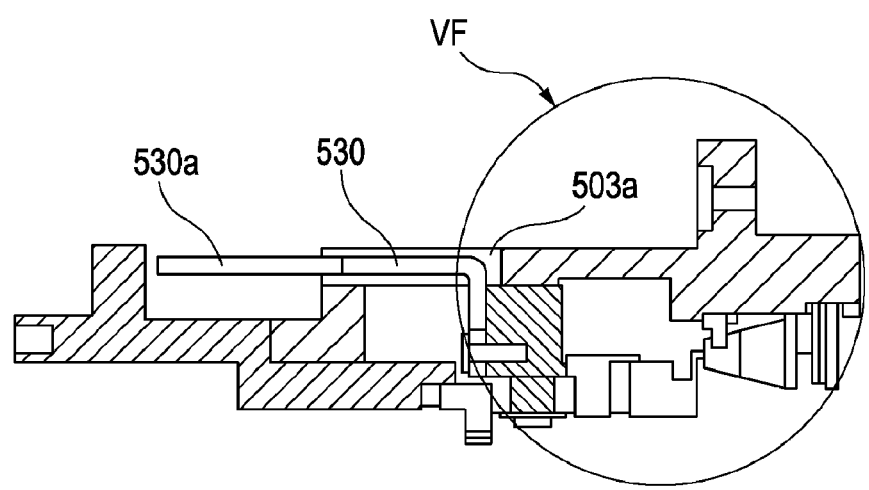

OPTICAL ENCODER AND APPARATUS USING OPTICAL ENCODER

BACKGROUND OF THE INVENTION

1. Field of the Invention

The present invention relates to devices for detecting displacement of movable bodies.

2. Description of the Related Art

To date, optical encoders have been used for detecting the positions of lenses in cameras, the rotational displacements of manual rings, and the like.

FIGS. 17A and 17B illustrate principal parts V of a rotary encoder according to a first conventional technology installed in an interchangeable lens for single-lens reflex cameras. The central line Z shown in FIG. 17A corresponds to the optical axis of the interchangeable lens.

A main scale 620 is indirectly connected to a cam (not shown) that drives the lens to move straight. The position of the lens that moves straight is detected by detecting the rotational angle of the main scale 620.

FIG. 17B is a partly enlarged view of the principal parts V shown in FIG. 17A. An index scale 630 faces the main scale 620. A light-emitting element 601 and a photointerrupter including a light-receiving element 604 are disposed so as to have the two scales interposed therebetween, and the rotational angle of the main scale 620 is detected by using the light-emitting element 601 and the photointerrupter.

According to this conventional technology, the encoder is of a transmissive type, and can have an angular U-shaped holder that supports the light-emitting element and the light-receiving element such that the two scales are clamped. Therefore, the size of encoder in a direction approximately perpendicular to the optical-axis direction is large, and it is difficult to reduce the overall size of the encoder. Moreover, the number of parts is large, resulting in poor assembling workability.

According to another conventional technology, the rotational angle is detected by using a reflective scale disposed on a cylinder.

According to a second conventional technology (Japanese Patent Laid-Open No. 5-203465), a detecting sensor is disposed outside or inside a cylindrical body.

In this second conventional technology, a reflective scale that is fixed to a columnar or cylindrical body and a reflective sensor are used for detection. Therefore, size reduction of this encoder is easier than that according to the first conventional technology.

However, sufficient resolution cannot be achieved using only the above-described structure. Moreover, these components are designed on the basis of a flat reflective scale, and loss in a light amount, displacement in a detection pitch, sensitivity in a gap characteristic, and the like caused by the deflection of light beams according to the influence of the curved reflecting surface are not discussed. Therefore, errors in an output-signal characteristic are generated by the radius of curvature, and desired performance cannot be achieved only by the second conventional technology.

Moreover, according to a third conventional technology (Japanese Patent Laid-Open No. 59-061711), a detecting sensor is disposed outside a cylinder such that the optical detection system is improved for high-precision detection.

However, according to the third conventional technology, the thickness of the detecting sensor is increased.

Recently, sensors capable of detecting positions with high resolution and high precision on the order of microns have been required for lens barrels installed in interchangeable lenses for digital single-lens reflex cameras, digital video cameras, and digital still cameras.

Moreover, smaller detecting sensors have become strongly required as the size of cameras has become smaller.

SUMMARY OF THE INVENTION

At least one exemplary embodiment is directed to devices which can be used as displacement-detecting mechanisms for lens barrels installed in optical apparatuses such as interchangeable lenses for cameras, digital video cameras, and digital still cameras.

At least one exemplary embodiment of the present invention is directed to a small optical encoder capable of high-precision high-resolution detection with consideration of a constant radius of curvature of curved reflective scales, for example, cylindrical scales, the optical encoder being also applicable to conventional flat reflective scales.

The optical encoder according to at least one exemplary embodiment of the present invention includes a curved reflective scale having the center of curvature disposed on a rotation axis and a constant radius of curvature, and a point light source for irradiating the reflective scale with divergent light beams.

Moreover, the distance between the reflective scale and the point light source can be substantially equal to the distance between the reflective scale and the light-receiving surface.

Moreover, the pitch of the reflective scale can be changed in accordance with the radius of curvature of the reflective scale.

According to at least one exemplary embodiment of the present invention, high-precision signals suitable for high resolution can be obtained.

Moreover, a very thin sensor without a lens can be obtained.

Further features of the present invention will become apparent from the following description of exemplary embodiments with reference to the attached drawings.

BRIEF DESCRIPTION OF THE DRAWINGS

FIGS. 12A to 12F are enlarged views illustrating variations of the optical layout according to at least one exemplary embodiment of the present invention.

FIG. 15 is an enlarged view of principal parts of the conventional technology.

DESCRIPTION OF THE EMBODIMENTS

Figure 1:
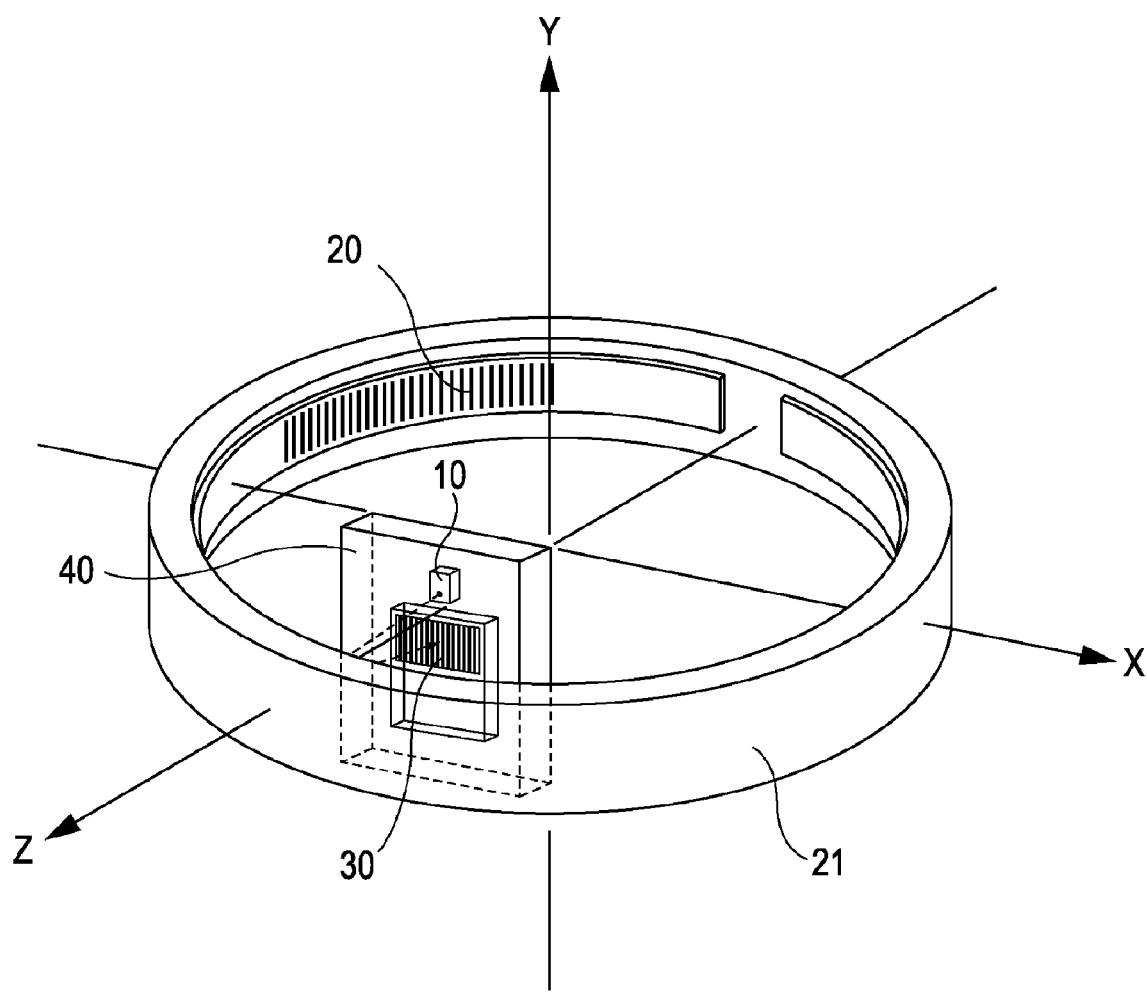
FIG. 1 is a perspective view illustrating a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

In all of the examples illustrated and discussed herein any specific values should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended Exemplary embodiments of the present invention will now be described, by way of example only, with reference to FIGS. 1 to 16.

First Exemplary Embodiment

FIG. 1 is a perspective view illustrating the structure of a reflective optical encoder according to a first exemplary embodiment of the present invention.

A reflective scale 20 is fixed to the inner circumference of a ring-shaped scale support 21 (e.g., with use of a double-sided adhesive tape).

A detecting head 40 is disposed inside the scale support 21 so as to face the reflective scale 20.

The detecting head 40 mainly includes semiconductor cells such as a light source 10 formed of an LED chip and a light-receiving unit 30 formed of a photo IC chip. A light-receiving portion and signal-processing circuits are embedded in the photo IC chip.

First, the LED chip serving as the light source 10 and the photo IC chip serving as the light-receiving unit 30 will be described.

Figure 2A:
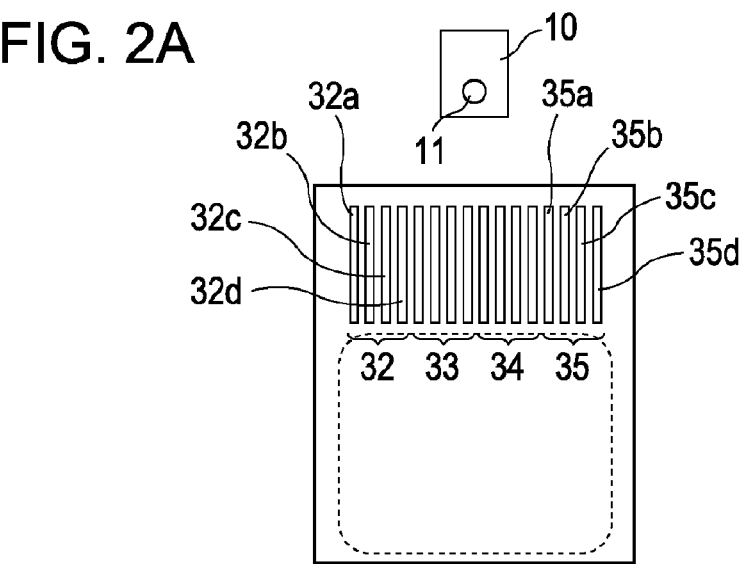
FIGS. 2A to 2C illustrate the structure of a detecting sensor.
Figure 2B:
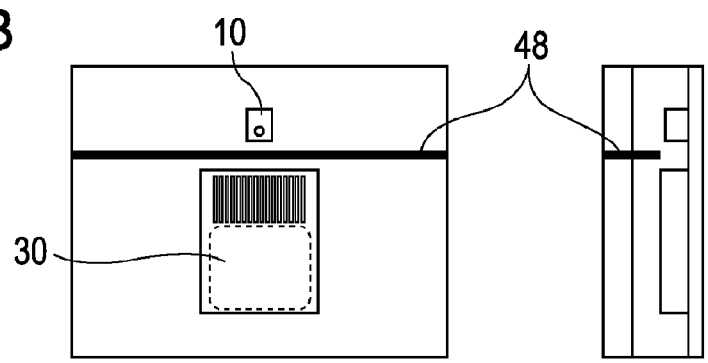
Figure 2C:
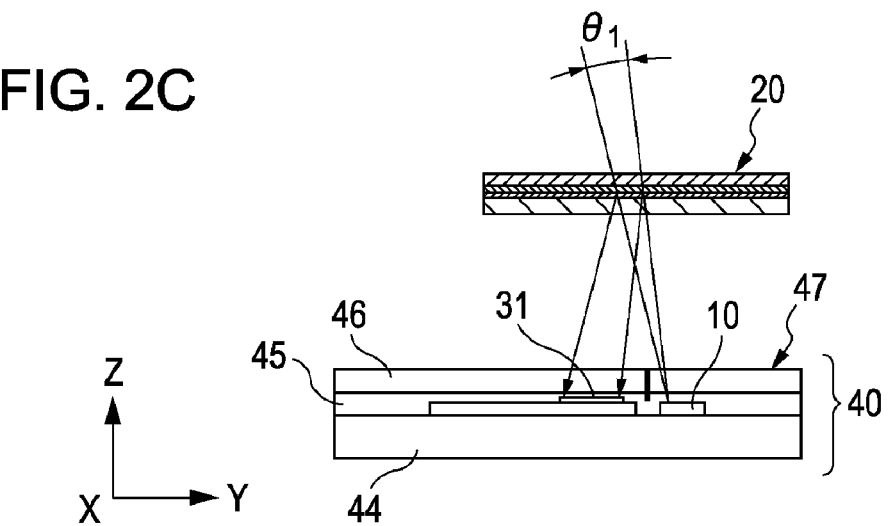

FIGS. 2A to 2C illustrate the detecting head 40 in detail.

In FIG. 2A, the LED chip and the photo IC chip are shown in detail. The LED chip is of a point emission type having a current-confined-path (CCP) structure. The effective emission area 11 of the LED chip can have a circular emission window having a diameter of approximately 70 μm. The LED chip can have an emission wavelength of 650 nm, and emits red light. The photo IC chip is disposed below the LED chip. The photo IC chip includes a light-receiving portion 31 disposed adjacent to the LED chip and a signal-processing circuit portion disposed below the light-receiving portion 31. The light-receiving portion 31 includes sixteen photodiodes, i.e., light-receiving elements 32a, 32b, 32c, 32d, . . . , 35a, 35b, 35c, and 35d aligned in this order from the left in the horizontal direction of the drawing with a pitch Pe.

Four light-receiving elements, i.e., two light-receiving elements that generate currents having an A phase and a B phase whose phases are shifted from each other by 90° and another two light-receiving elements that generate currents having a C phase and a D phase whose phases are shifted from the A phase and B phase, respectively, by 180°, are grouped into one set, and four sets of the light-receiving elements are disposed on the photo IC chip.

With reference to FIG. 2A, an element set 32 includes four light-receiving elements 32a, 32b, 32c, and 32d.

The same applies to element sets 33, 34, and 35 shown in FIG. 2A.

These element sets 32, 33, 34, and 35 are disposed with a pitch P, which is referred to as "a pitch P of the light-receiving element sets" hereafter.

Electrical connection of these light-receiving elements will now be described.

In FIG. 2A, the light-receiving elements 32a, 33a, 34a, and 35a having a character of "a" added to their reference numbers are referred to as an A-phase group, and are electrically connected to each other. Similarly, the light-receiving elements having characters of "b", "c", and "d" are referred to as a B-phase group, a C-phase group, and a D-phase group, respectively.

Output currents having A, B, C, and D phases whose phases are shifted by 90° are obtained from the A-phase, B-phase, C-phase, and D-phase groups of the light-receiving elements, respectively, as the reflective scale 20 is moved.

After the currents are converted into voltages by a current-to-voltage converter, a difference between the A phase and the C phase and a difference between the B phase and the D phase are detected by a differential amplifier such that output signals denoting displacement of A' and B' phases whose phases are shifted by 90° are obtained.

Specific numerical values of layout of the light-receiving elements in the first exemplary embodiment will now be described.

The light-receiving elements 32a, 32b, 32c, 32d, . . . , 35a, 35b, 35c, and 35d, which are the minimum unit of the light-receiving portion, are disposed with a pitch Pe. Specifically, sixteen light-receiving elements are disposed with the pitch Pe of 64 μm.

Moreover, the element sets 32, 33, 34, and 35 are disposed with a pitch P of 256 μm, which is four times as large as the pitch Pe of 64 μm.

The pitch P of the light-receiving element sets is also referred to as a fundamental detection pitch of the detecting head.

FIGS. 2B and 2C illustrate a package in which the above-described semiconductor cells are sealed. In FIG. 2B, a light-shielding wall 48 for preventing light from directly entering the light-receiving portion 30 from the emission area 11 of the light source 10 is shown. FIG. 2C illustrates cross-sections of the detecting head and the reflective scale, and simplified optical paths of light beams. In addition to the light source 10 and the light-receiving unit 30, the detecting head 40 includes a wiring board 44, a translucent sealing resin layer 45 that covers the light source 10 and the light-receiving unit 30, and a transparent glass layer 46 disposed on the sealing resin layer 45.

Next, the reflective scale will be described with reference to FIGS. 3A to 3D.

Figure 3A:
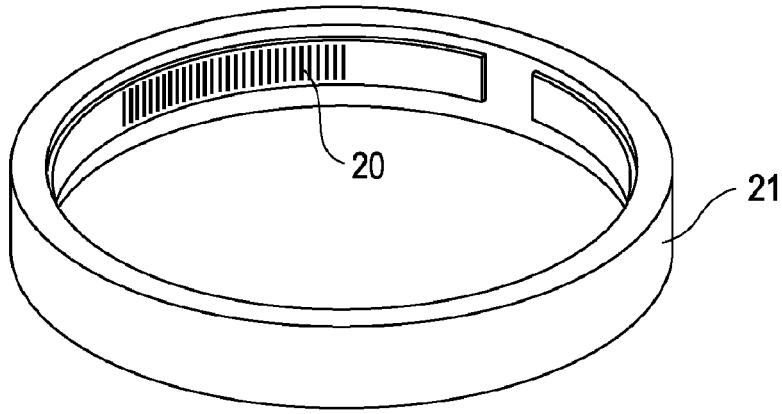
FIGS. 3A to 3D illustrate a cylindrical reflective scale film.
Figure 3B:

In this exemplary embodiment, a flat reflective scale shown in FIG. 3B can be bonded to the inner circumference of the ring-shaped scale support 21 using a double-sided adhesive tape (not shown) as shown in FIG. 3A.

Figure 3C:
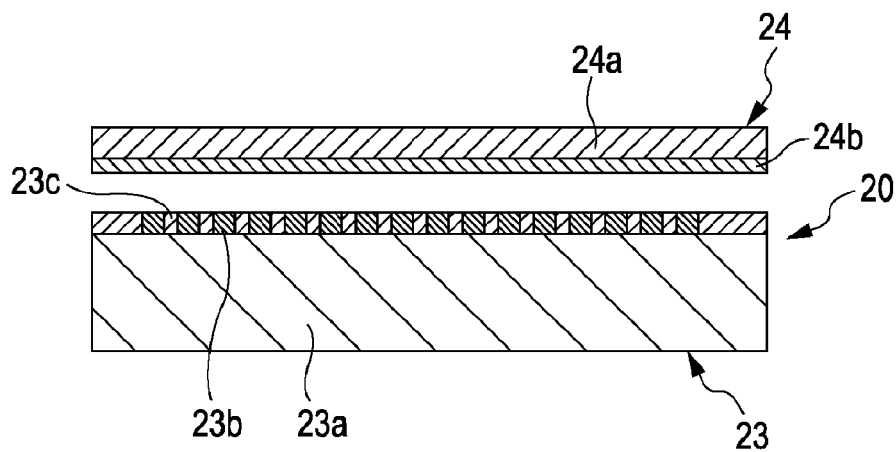

The reflective scale 20 includes a patterned sheet 23 and a reflective-layer sheet 24 shown in FIG. 3C.

The patterned sheet 23 is formed of a transparent PET film used for, for example, an industrial photomechanical process. The film can have a thickness of approximately 0.1 to 0.2 mm, and is patterned through steps of exposure and development of an emulsion layer of the film as required.

The patterned sheet 23 includes a base 23a and a patterned layer disposed on the base 23a. The patterned layer has non-reflective portions 23b that absorb light and transmissive portions 23c that transmit light, the non-reflective portions 23b and the transmissive portions 23c being disposed alternately.

On the other hand, the reflective-layer sheet 24 includes a first reflective layer 24a formed of a PET film serving as a base, and a second reflective layer 24b disposed on the lower surface of the first reflective layer 24a and formed of an evaporated film.

Figure 3D:
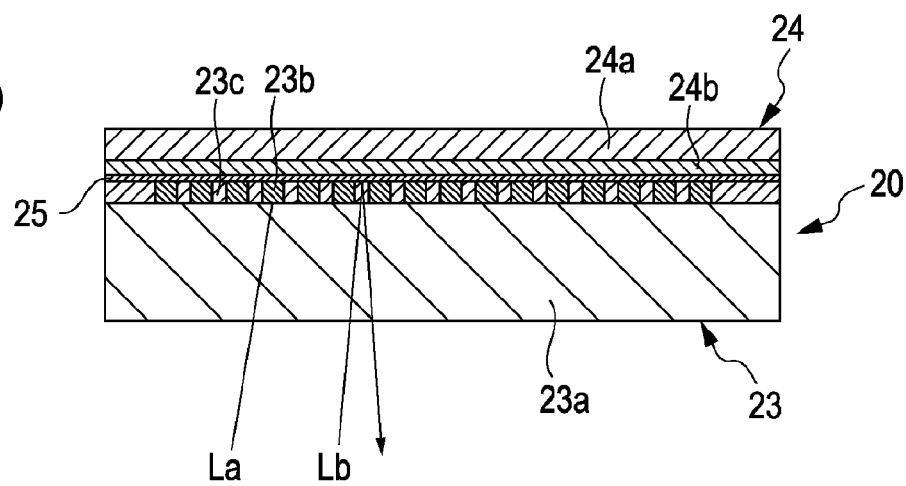

As shown in FIG. 3D, the reflective scale 20 is formed by bonding the patterned sheet 23 and the reflective-layer sheet 24 using a bonding layer 25 composed of a transparent adhesive.

The reflective scale 20 can have thickness of approximately 0.2 mm, and is flexible. Thus, the reflective scale 20, which is originally an elongated plate as shown in FIG. 3B, can be curved so as to be attached to the inner circumference of the cylinder as shown in FIG. 3A.

[Principle of Detection Using Flat Reflective Scale]

Next, the principle of detection using a flat reflective scale and a detecting sensor according to the present invention will be described.

Optical effects when a flat reflective scale is irradiated with divergent light beams will now be described with reference to FIG. 4.

Figure 4:
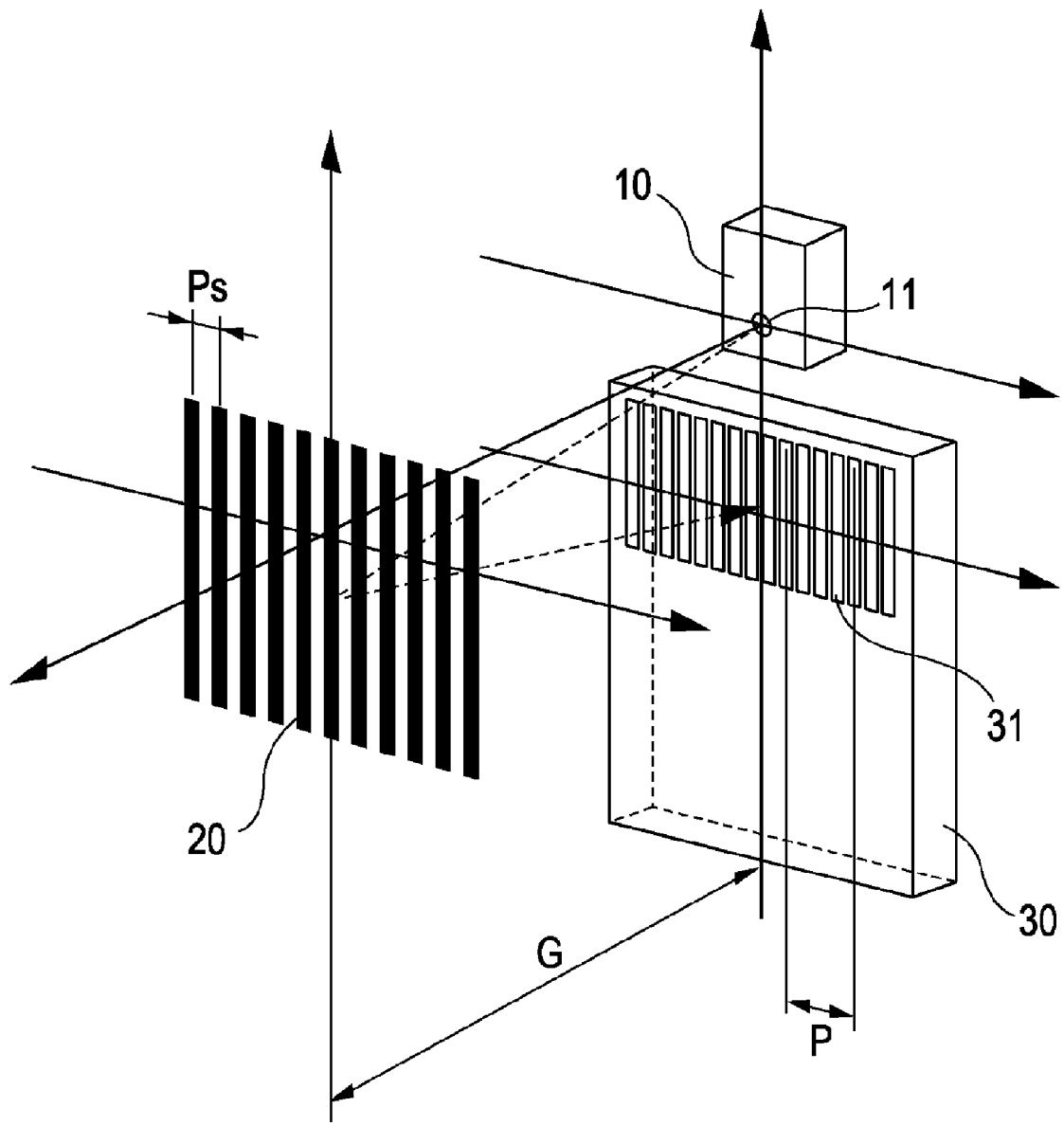
FIG. 4 illustrates the layout of an optical system using a flat reflective scale.

FIG. 4 illustrates the configuration of a reflective encoder.

Herein, the reflective scale 20 is disposed so as to be flat. The flat reflective scale 20 is irradiated with divergent light beams emitted from the light source 10, and interference fringes are formed on the light-receiving portion 31 of the light-receiving unit 30 by reflected diffracted light beams from the reflective scale 20.

The light-receiving portion 31 and the reflective scale 20 are remote from each other with a gap G. When the flat reflective scale is used, the pitch Pf of the interference fringes formed on the light-receiving portion 31 is exactly twice the pitch Ps of the reflective scale 20 (Pf=2×Ps).

This will be described with reference to FIG. 5, which is an optical system equivalent to the configuration shown in FIG. 4.

Figure 5:
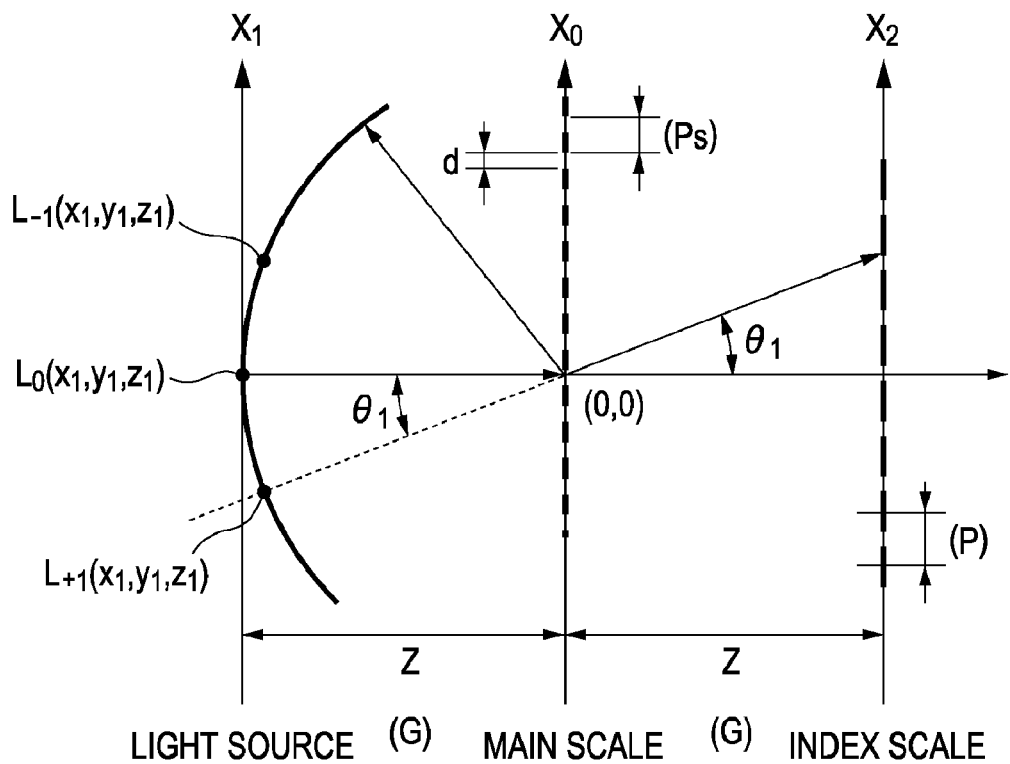
FIG. 5 is an equivalent optical system illustrating an interference figure formed by divergent light beams.

In FIG. 5, the reflective scale 20, the light-receiving portion 31, and the light source 10 are disposed on axes $X_0$, $X_2$, and $X_1$, respectively. The emission area 11 of the light source 10 is disposed on a point $L_0$.

Distances $X_0$-$X_2$ and $X_0$-$X_1$ in FIG. 5 correspond to the gap G between the reflective scale 20 and the light-receiving portion 31.

A divergent light beam emitted from the point $L_0$ of the light source is incident on the reflective scale 20 disposed on the axis $X_0$. The light beam diffracted from the diffraction grating surface is shown in the drawing.

The light beam that is emitted from the point $L_0$ and reaches the origin (0, 0) on the surface of the reflective scale is diffracted with a diffraction angle $\theta_1$ and enters the light-receiving portion 31.

An intersection of the diffracted light beam extending in a direction opposite to the traveling direction and a circle having the origin (0, 0) and a radius G is defined as a point $L_{+1}$.

At this time, the diffracted light beam forms a wavefront as if the light source were disposed at the point $L_{+1}$.

Thus, the light intensity distribution of an interference figure can be calculated by assuming that diffracted light beams of various orders are emitted from these virtual light source points $L_{+1}, L_{-1}, \ldots$ distributed on the circumference of the circle having the radius G depending on the corresponding orders and that the interference figure is formed by overlapping the divergent light beams emitted from the virtual light source points.

In this case, the intensity distribution of the interference fringes projected onto the surface of the light-receiving portion can be obtained from a geometrical relation shown in FIG. 5. That is, the ratio β of the pitch Pf of the interference fringes to the pitch Ps of the reflective scale is Pf/Ps=(z+z)/z=2. Thus, the pitch Pf of the interference fringes is twice the pitch Ps of the reflective scale 20.

[Principle of Detection Using Curved Reflective Scale]

Next, the principle of detection of a curved reflective scale, to which the present invention is applied, will be described.

Figure 6:
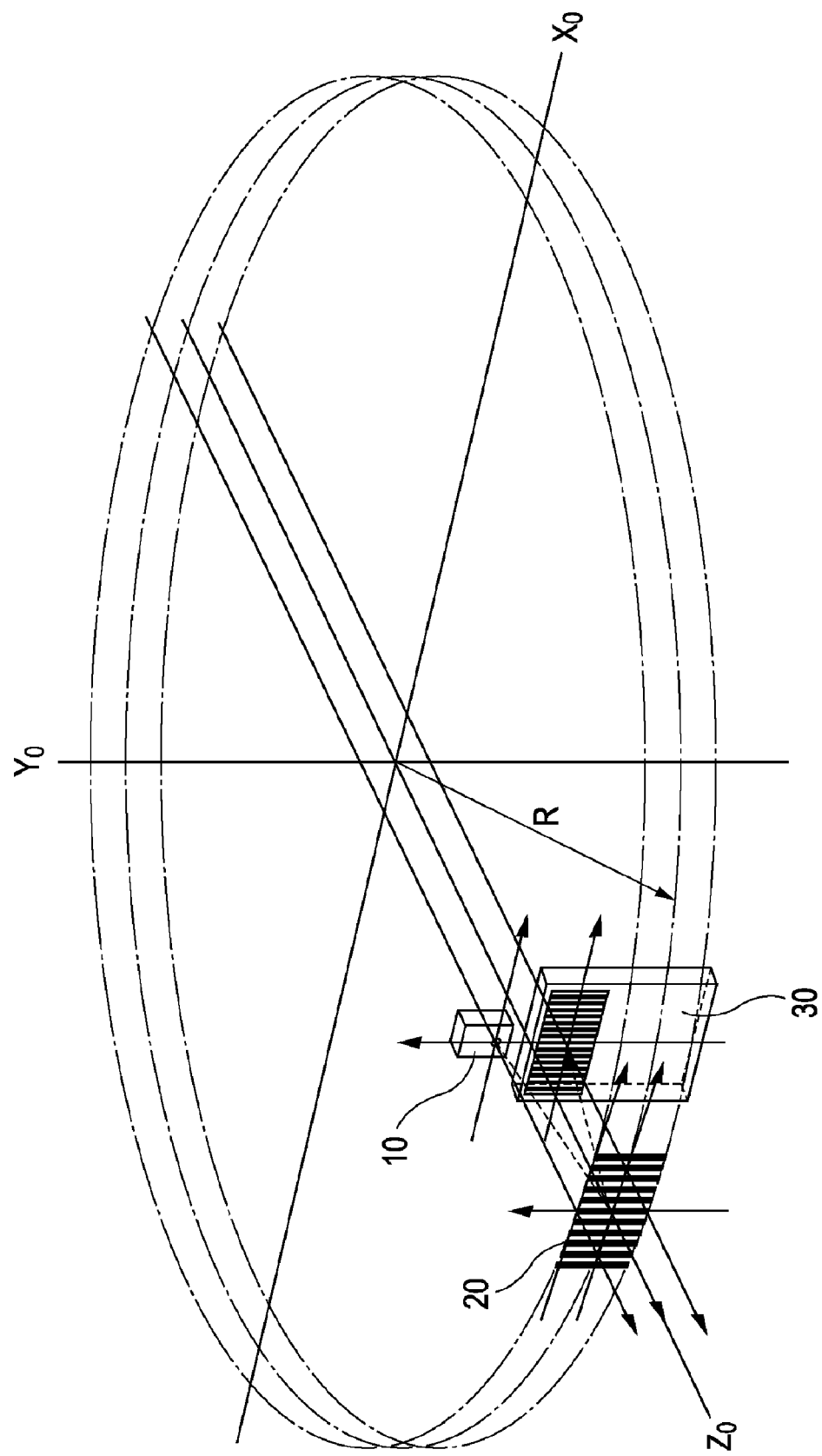
FIG. 6 illustrates an optical layout according to at least one exemplary embodiment of the present invention.

FIG. 6 illustrates the reflective scale 20 having a fixed cylindrical shape, the light source 10, and the light-receiving unit 30 disposed according to the configuration of this exemplary embodiment. The scale support 21 and components other than the principal parts in the detecting head are omitted.

In FIG. 6, the center of the reflective scale 20 is set on a rotation axis $Y_0$, and the displacement in rotation of the reflective scale about the rotation axis $Y_0$ is detected by the detecting head 40 (not shown).

Figure 7:
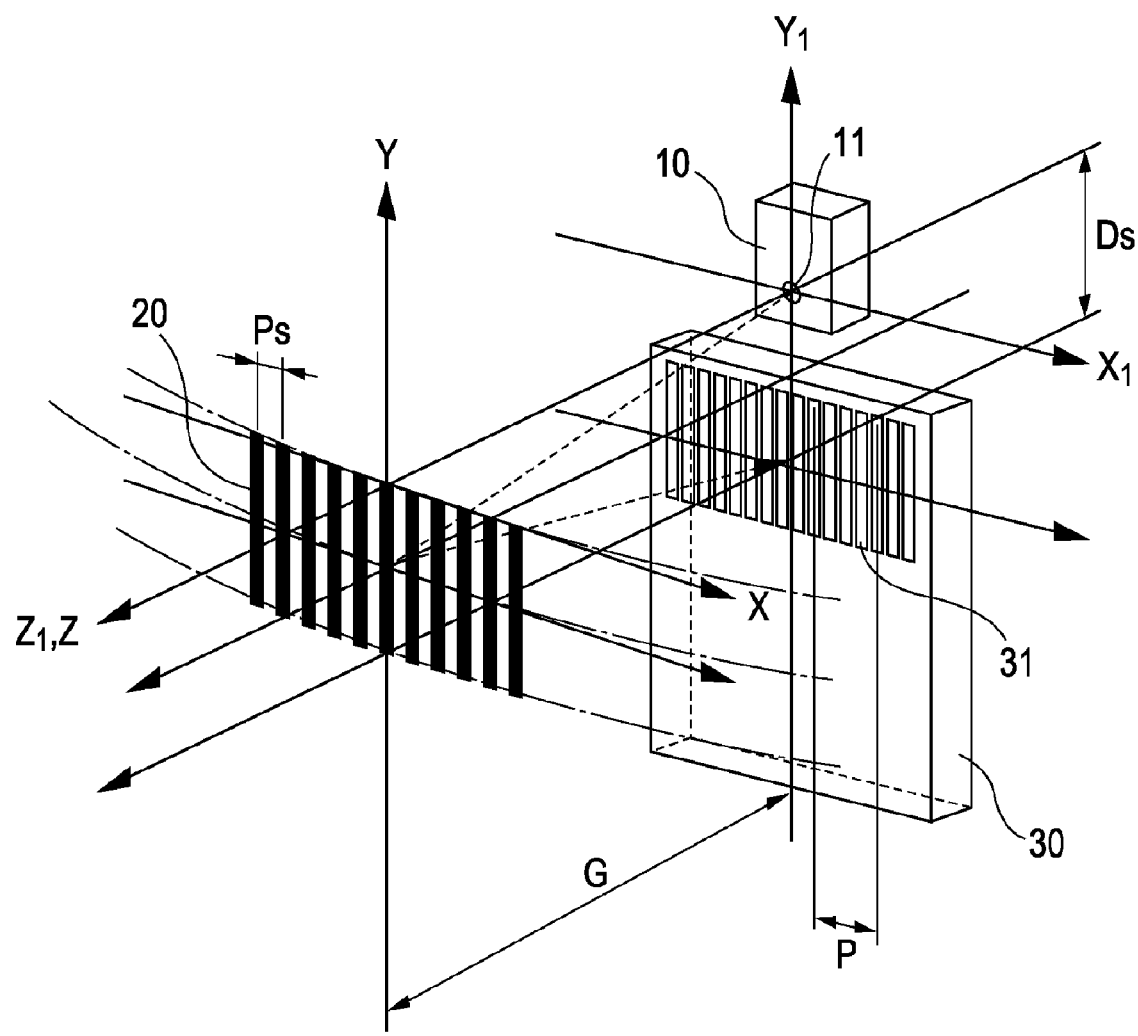
FIG. 7 is an enlarged view of the optical layout according to at least one exemplary embodiment of the present invention.

Herein, the distance between the reflective surface of the cylindrical reflective scale and the center thereof, i.e., the radius, is defined as R. FIG. 7 is an enlarged view of the principal parts shown in FIG. 6.

With reference to FIG. 7, the layout of the light source 10, the light-receiving unit 30, and the reflective scale 20 will now be described.

A coordinate system $(x_1, y_1, z_1)$ has the origin (0, 0, 0) at the center of the emission area 11 of the light source 10.

A line formed by connecting the axis $Y_0$ at the center of the cylindrical reflective scale 20 shown in FIG. 6 and the emission center of the light source, i.e., the origin of the coordinate system, is defined as an axis $Z_1$, and an axis parallel to the rotation axis $Y_0$ is defined as an axis $Y_1$.

A direction of a tangential line of detection of rotational displacement is defined as an axis $X_1$.

The distance between the emission surface of the light source 10 and the position of the substantial reflecting surface of the reflective scale 20 remote from the axis $Y_0$ by the distance R is referred to as the gap G.

The sixteen light-receiving elements are disposed symmetrically with respect to the axis $Y_1$ in two groups of eight. When the distance between the center of the light-emitting element and the center of the light-receiving portion is defined as Ds, the central coordinates of the light-receiving portion are represented by (0, −Ds, 0).

Moreover, the coordinates at a reflection position on the reflective scale 20 are represented by (x, y, G).

With the above-described positional relationship, the cylindrical reflective scale having the pitch Ps, which is half the pitch Pf, is used. Divergent light beams emitted from the emission area 11 of the light source 10 are incident on the reflective scale 20 while retaining the divergent wavefronts, and part of the reflected waves reaches the light-receiving unit 30.

When the reflective scale having half the pitch P of the light-receiving element sets is used in a concave manner, interference fringes having a period smaller than the pitch P of the light-receiving elements are formed on the light-receiving surface.

Specifically, the pitch P of the light-receiving elements is 256 μm in this exemplary embodiment.

When the reflective scale 20 having a pitch Ps of 128 μm, which is an appropriate value when the reflective scale 20 is used in a flat manner, is curved into a cylindrical shape as shown in FIG. 1, an intensity distribution of light having a period smaller than the period of 256 μm is formed on the surface of the light-receiving portion.

Figure 8:
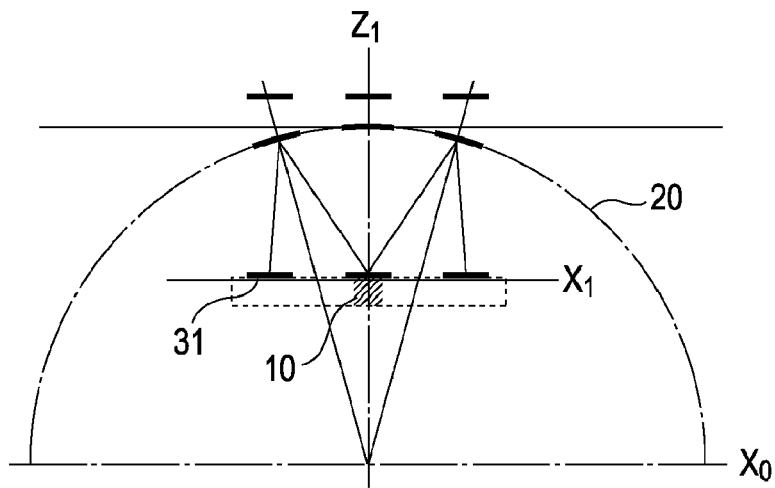
FIG. 8 is a schematic view of optical paths of light beams.

FIG. 8 is a schematic view shown from above the axis $Y_0$ including only the half of the cylindrical reflective scale.

In this drawing, the pitch Ps of the reflective scale is changed such that the pitch Pf of the interference fringes formed by light beams that are emitted from the light source, reflected by the reflective scale, and projected onto the light-receiving surface becomes the same value as the pitch P of the light-receiving elements.

The pitch Pf of the interference fringes cannot be uniformly matched to the pitch P of the light-receiving elements on the surface of the light-receiving portion. However, characteristics that are sufficiently deserving of practical use can be obtained by averagely matching the pitch Pf of the interference fringes to the pitch P of the light-receiving elements on the light-receiving surface.

The pitch of the interference fringes formed by the reflected diffracted light beams from the curved reflective scale will now be described with reference to an equivalent optical system shown in FIG. 9 as in the case of the equivalent optical system of the divergent light beams shown in FIG. 5.

The wavefronts of the divergent light beams emitted from the light source are changed by the reflection from the curved surface of the reflective scale.

In this case, the expansion of the divergent wavefronts is regulated due to the influence of the concave cylindrical surface.

Figure 9:
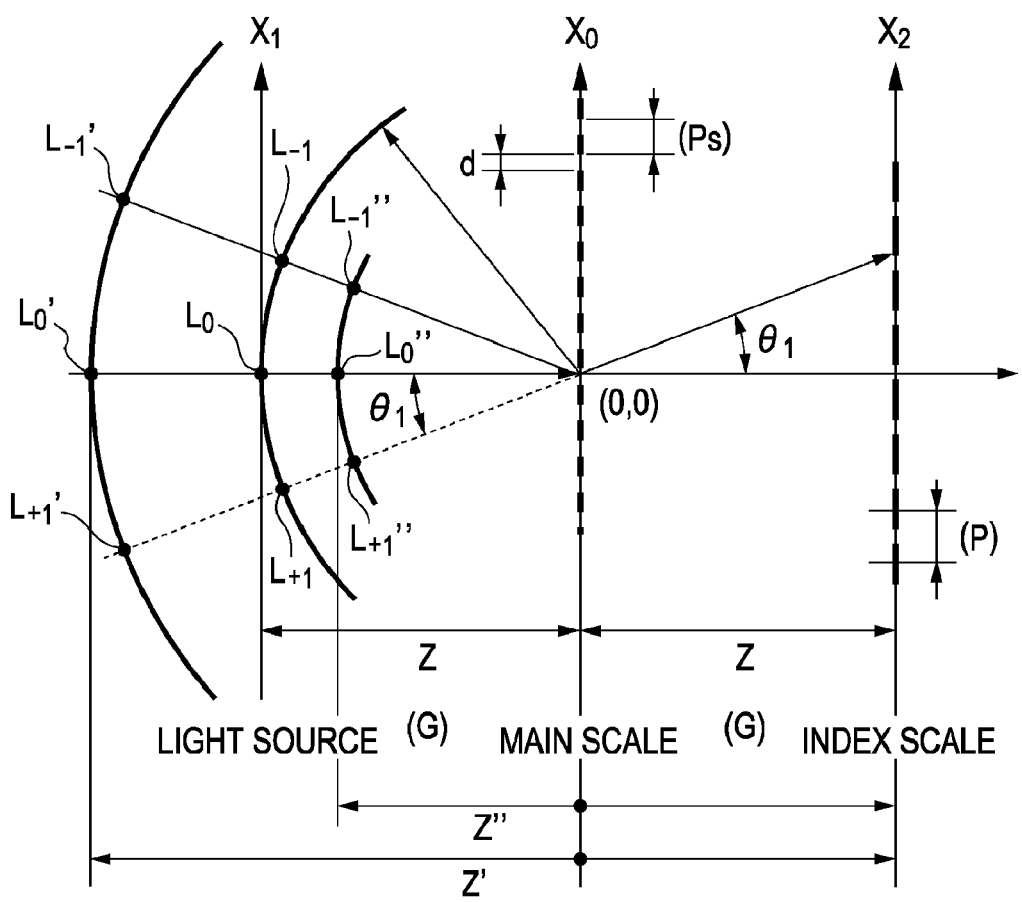
FIG. 9 is an equivalent optical system using the curved reflective scale according to at least one exemplary embodiment of the present invention.

Therefore, as a result of the wavefront change according to the concave cylindrical surface, the virtual light source points of the light beams diffracted from the reflective scale 20 to the light-receiving surface are conceivably moved from the positions of the virtual light source points $L_0$, $L_{+1}$, $L_{-1}$, ... to positions $L_0'$, $L_{+1}'$, $L_{-1}'$, ... remote from the origin (0, 0) on the reflective scale by a distance z' as shown in FIG. 9.

As a result, the distance between the diffraction surface of the reflective scale and the virtual light source points $L_0'$, $L_{+1}'$, $L_{-1}'$, ... is changed to z' while the distance z between the diffraction surface of the reflective scale and the light-receiving portion is unchanged, and the pitch Pf of the interference figures on the axis $X_2$ corresponding to the surface of the light-receiving portion is changed.

When the reflective scale is flat, the distance between the light source point and the reflective scale is equal to the distance between the reflective scale and the light-receiving surface. Therefore, the pitch Ps of the reflective scale 20 is equal to half the pitch Pf of the interference fringes.

That is, the ratio β is represented by Pf/Ps=(z+z)/z=2 when the flat reflective scale is used. However, the ratio β according to this exemplary embodiment is represented by Pf/Ps=(z'+z)/z', and thus the pitch Pf of the interference fringes is not twice the pitch Ps of the reflective scale.

Moreover, when the reflective scale is disposed on the outer surface of the cylindrical reflective scale support and the detecting head 40 is disposed so as to face the reflective surface of the scale, i.e., when the cylindrical surface is convex, the wavefronts are conversely changed.

At this time, the virtual light source points are moved to positions $L_0''$, $L_{+1}''$, $L_{-1}''$, ... remote from the origin (0, 0) on the reflective scale by a distance z" shown in FIG. 9, and the ratio β becomes larger than 2.

Therefore, the pitch Pf of the interference fringes formed on the light-receiving surface can be averagely matched to the pitch P of the light-receiving elements. Thus, the pitch Ps of the reflective scale is changed such that the pitch Pf of the interference fringes is matched to the pitch P of the light-receiving elements.

Specifically, calculation of corrected pitch of the reflective scale when a sensor whose light-receiving elements are aligned with a pith P is applied to the detecting head 40 disposed inside the cylindrical reflective scale 20 will now be discussed.

The principle of the smallest optical path length (Fermat's principle) will be used for calculating the desired pitch Pf of the interference fringes on the light-receiving surface.

A coordinate point (x, y, G) on the surface of the reflective scale, at which the sum (represented by Expression 1) of an optical path length L1 between the light source 10 and the reflective scale 20 and an optical path length L2 between the reflective scale 20 and the center of the light-receiving portion 31 is minimized, is determined. The pitch Ps of the cylindrical reflective scale is determined from the x coordinate.

$$f[x, y] = \sqrt{x^2 + \left(G - R + \sqrt{R^2 - x^2}\right)^2 + y^2} + \sqrt{(x - P)^2 + \left(G - R + \sqrt{R^2 - x^2}\right)^2 + (y - Ds)^2}$$

[Expression 1]

where

R: radius of the cylindrical reflective scale;

G: distance between the light source and the reflective scale;

Ds: distance between the center of the light-emitting portion and the center of the light-receiving portion; and P: fundamental detection pitch of the detecting head, i.e., pitch of the light-receiving element sets.

The correction pitch calculated at this time is available in the vicinity of the optical axis, but small displacements are observed at positions remote from the optical axis.

Therefore, the pitch of the reflective scale is changed such that the pitch Pf of the interference fringes is matched to the pitch of the light-receiving elements averagely on the surface of the light-receiving portion.

As described above, when the cylindrical reflective scale is used, an optimum pitch Ps of the reflective scale can be determined by adjusting the gap G between the reflective scale and the sensor, the fundamental detection pitch P of the detecting head (pitch P of the light-receiving elements), and the distance Ds between the light source and the light-receiving portion.

As a result of this scale pitch correction, position detection with high precision can be performed substantially in the same manner as the flat reflective scale even when the reflective scale is cylindrical.

Second Exemplary Embodiment

Herein, the structure according to the first exemplary embodiment is referred to as being of a concave type.

In a second exemplary embodiment, the relationship between the gap G and the radius R of the cylindrical reflective scale 20 of the concave type will be described with reference to modifications.

FIGS. 12A to 12F illustrate optical paths of the concave type in six cases. The sizes of the pitches Ps of the reflective scale are schematically illustrated by solid lines on arcs having a radius R (shown by dotted lines).

1. In FIG. 12A, the gap G is relatively small.
2. In FIG. 12B, the gap G is equal to half the radius R, and at this time, the pitch Ps of the reflective scale becomes substantially equal to the pitch P of the light-receiving elements (P=Ps).
3. In FIG. 12C, the pitch Ps of the reflective scale becomes larger than that shown in FIG. 12B, and the resolution of the reflective scale becomes low as a rotary encoder. Thus, the reflective scale in this state is of little value in use.
4. In FIG. 12D, light beams are converged on a part of the light-receiving surface, and no interference fringes are formed.
5. In FIG. 12E, the moving direction of the fringes is changed, and as a result, the A' and B' phases of signals are reversed.
6. In FIG. 12F, the pitch of the reflective scale becomes substantially equal to that shown in FIG. 12A, and the moving direction of the interference fringes is reversed.

Third Exemplary Embodiment

A third exemplary embodiment will now be described.

Figure 10:
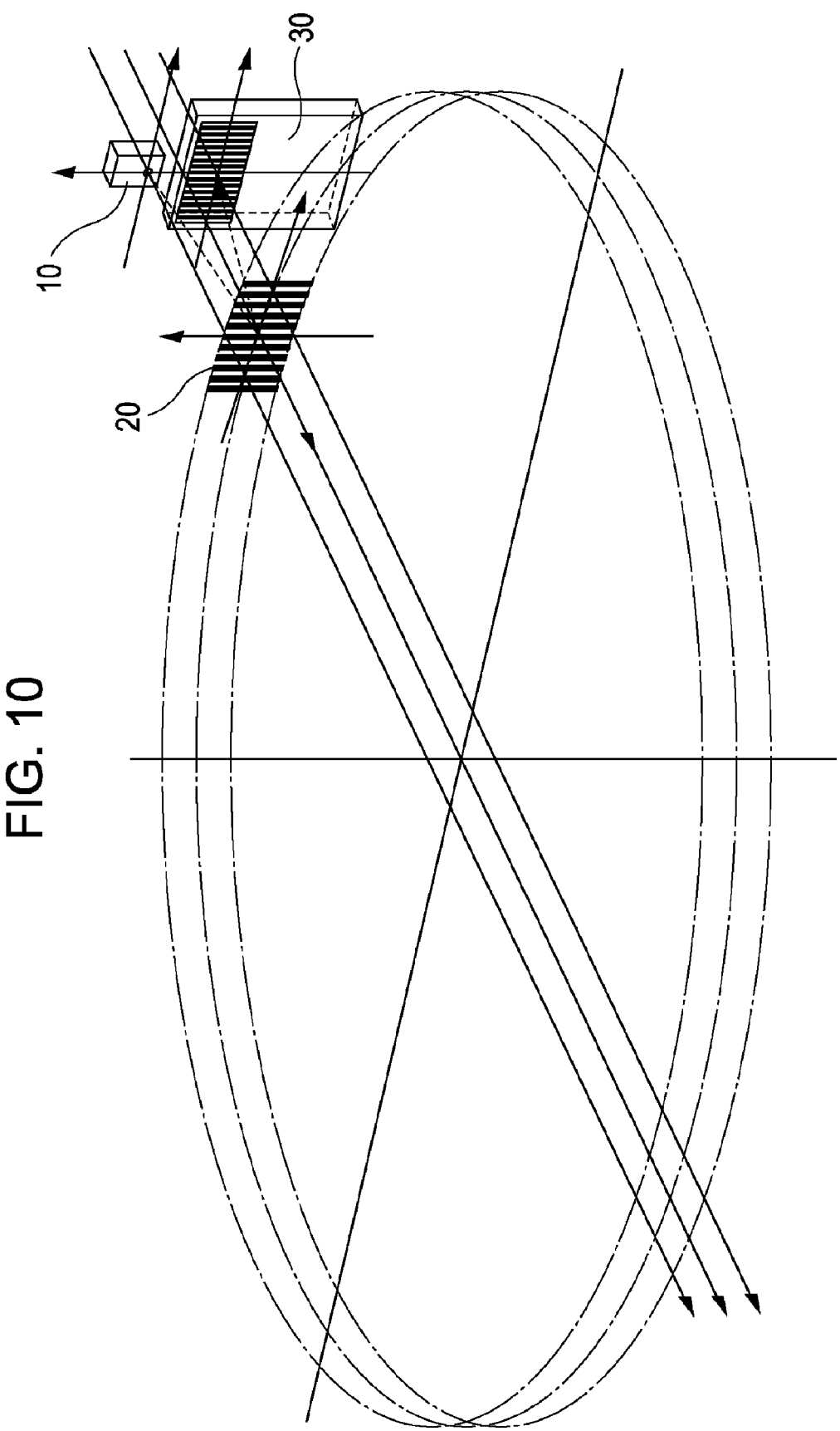
FIG. 10 illustrates a second exemplary embodiment of the present invention.
Figure 11:
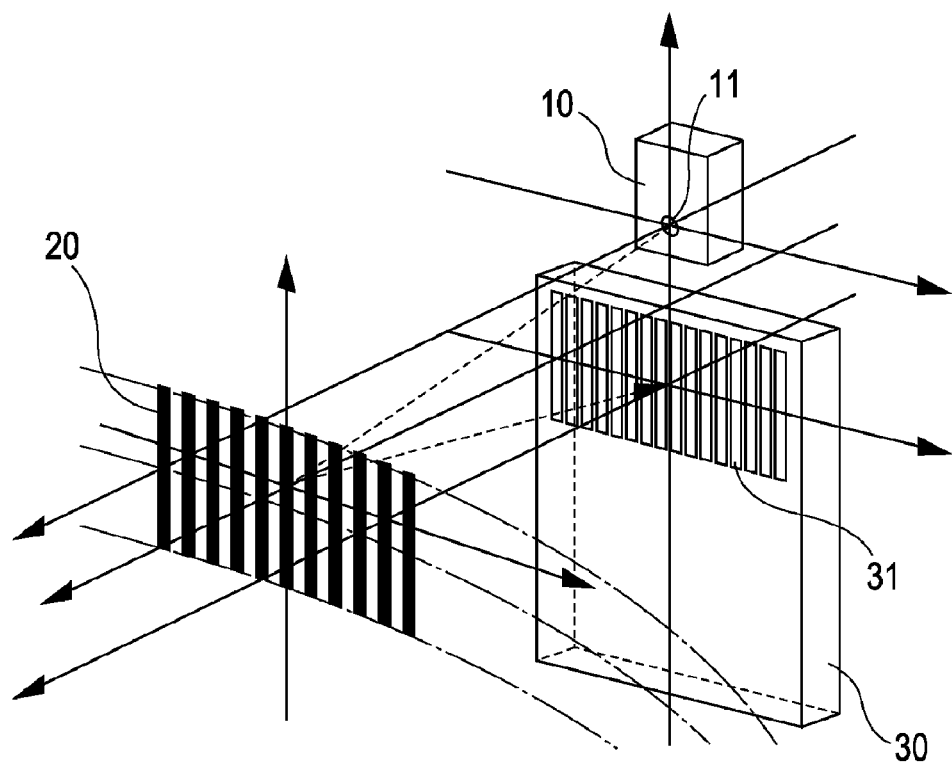
FIG. 11 is an enlarged view of an optical layout according to at least one exemplary embodiment of the present invention.

FIGS. 10 and 11 illustrate a reflective scale 20 disposed on the outer surface of a cylinder and a detecting head 40 facing the reflective surface of the scale.

Since the difference between the first exemplary embodiment and the third exemplary embodiment is only that the detecting head 40 is disposed inside or outside the cylindrical reflective scale, detailed explanation will be omitted.

Herein, the structure according to the third exemplary embodiment is referred to as being of a convex type in contrast to that of the concave type according to the first exemplary embodiment.

The pitch Ps of the reflective scale 20 of the convex type is corrected to a smaller value. Therefore, when the pitch P of the light-receiving elements and the radius R are the same as those in the first exemplary embodiment, the resolution of the convex type can be substantially increased compared with that of the concave type according to the first exemplary embodiment.

Figure 13C:
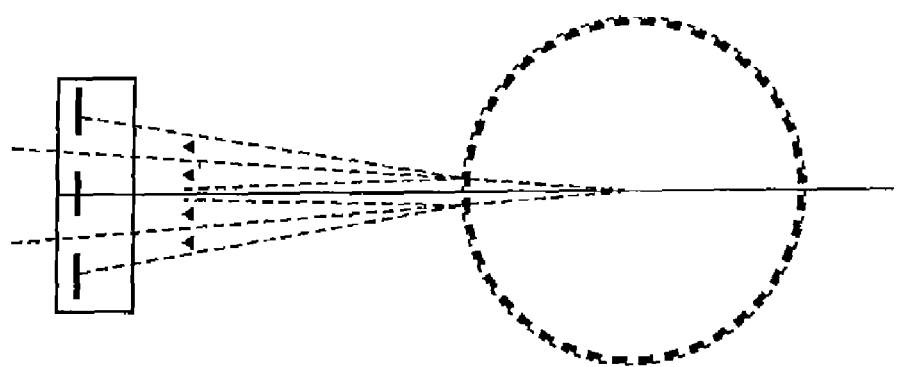
FIGS. 13A to 13C illustrate a third exemplary embodiment of the present invention.
Figure 13B:
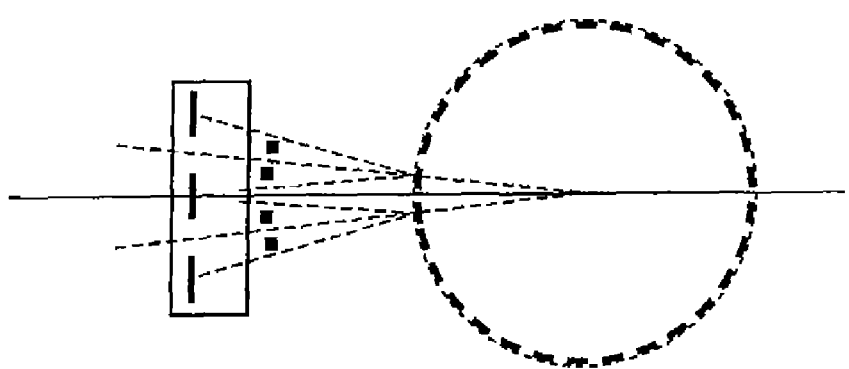
Figure 13A:
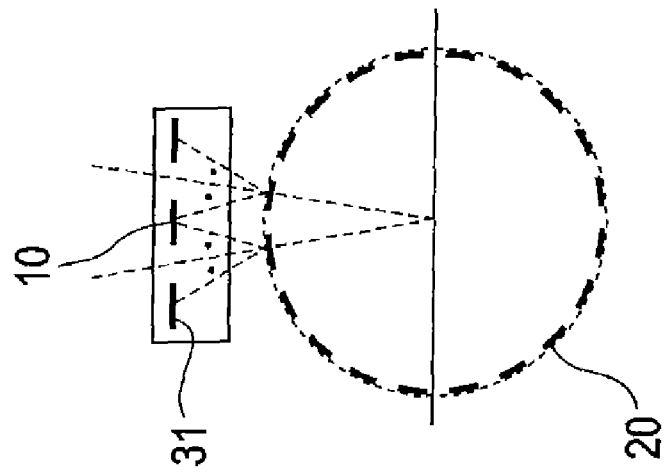

As shown in FIGS. 13A to 13C, when the radius of the cylindrical reflective scale is constant, the resolution of rotation detection can be increased by increasing the distance between the detecting head and the reflective scale (gap G) and by appropriately determining the corrected pitch Ps of the reflective scale. The pitch of the reflective scale must be reduced as the gap G is increased in the order of FIGS. 13A to 13C, and as a result, the resolution of detection of the rotational angle is improved.

In general, the detecting sensor can only detect a specific detection pitch.

That is, the pitch detected by the detecting sensor is determined by the pitch P of the light-receiving elements, and the detecting sensor reads out the spatial frequency of the fundamental wave of the interference fringes (light intensity distribution having periodic intensity) that are projected onto the surface of the light-receiving portion.

In order to support various resolutions, several measures are available for the detecting sensor.

1. The pitch P of the light-receiving elements is changed so as to be matched to the pitch to be detected.
2. Recently, light-receiving elements have been configured as so-called photo IC chips including electronic circuits such as amplifying circuits, digitizing circuits, and electrical division circuits integrated together. In order to support various resolutions, the number of divisions of the electrical division circuits is changed.
3. Rotary encoders can change the resolution per rotation by changing the diameters of the reflective scales thereof. Thus, the diameters of the reflective scales are changed for supporting various resolutions.

According to the second and third exemplary embodiment of the present invention, the resolution can be changed by changing the pitch Ps of the reflective scale without changing the diameter of the cylinder. This new measure is effective for supporting arbitrary resolution.

As in the second exemplary embodiment when the sensor is disposed inside the cylinder, the detection pitch can be increased compared with that in the case using the flat reflective scale.

As in the third exemplary embodiment when the sensor is disposed outside the cylinder, the resolution can be increased.

For example, the resolution using the cylindrical reflective scale having a diameter of 10 mm can be increased to four times. In this case, the gap can be increased. Semiconductor lasers (surface emitting lasers) or the like that focus the energy in the vicinity of the principal rays thereof even when the light beams are divergent are used as effective light sources.

Fourth Exemplary Embodiment

A sensor and a reflective scale, which are installed in a lens barrel, according to an exemplary embodiment of the present invention will now be described with reference to the drawings.

Figure 14:
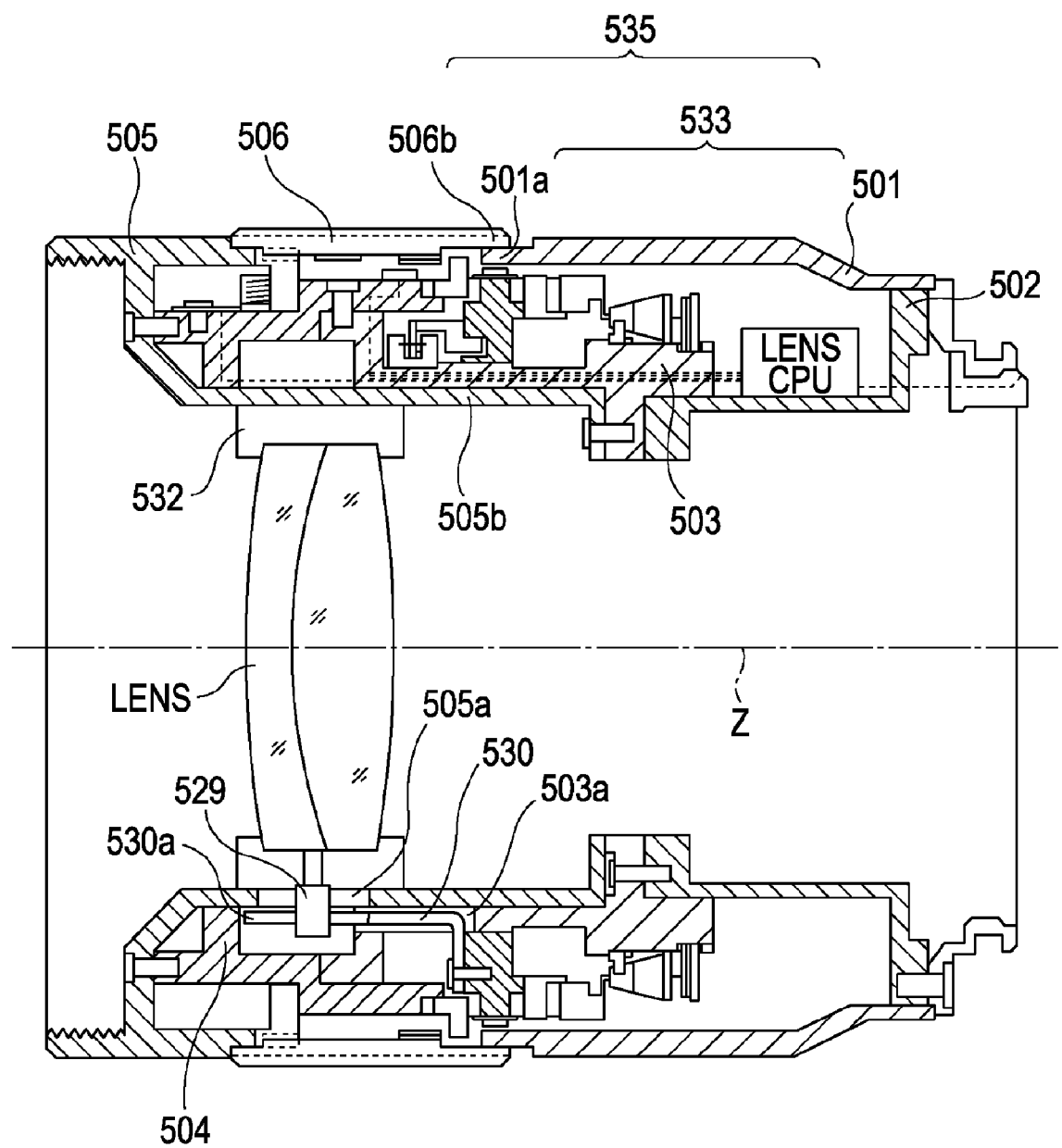
FIG. 14 illustrates a conventional technology compared with a fourth exemplary embodiment of the present invention.

FIG. 14 is a cross-sectional view of a conventional lens barrel.

Figure 16:
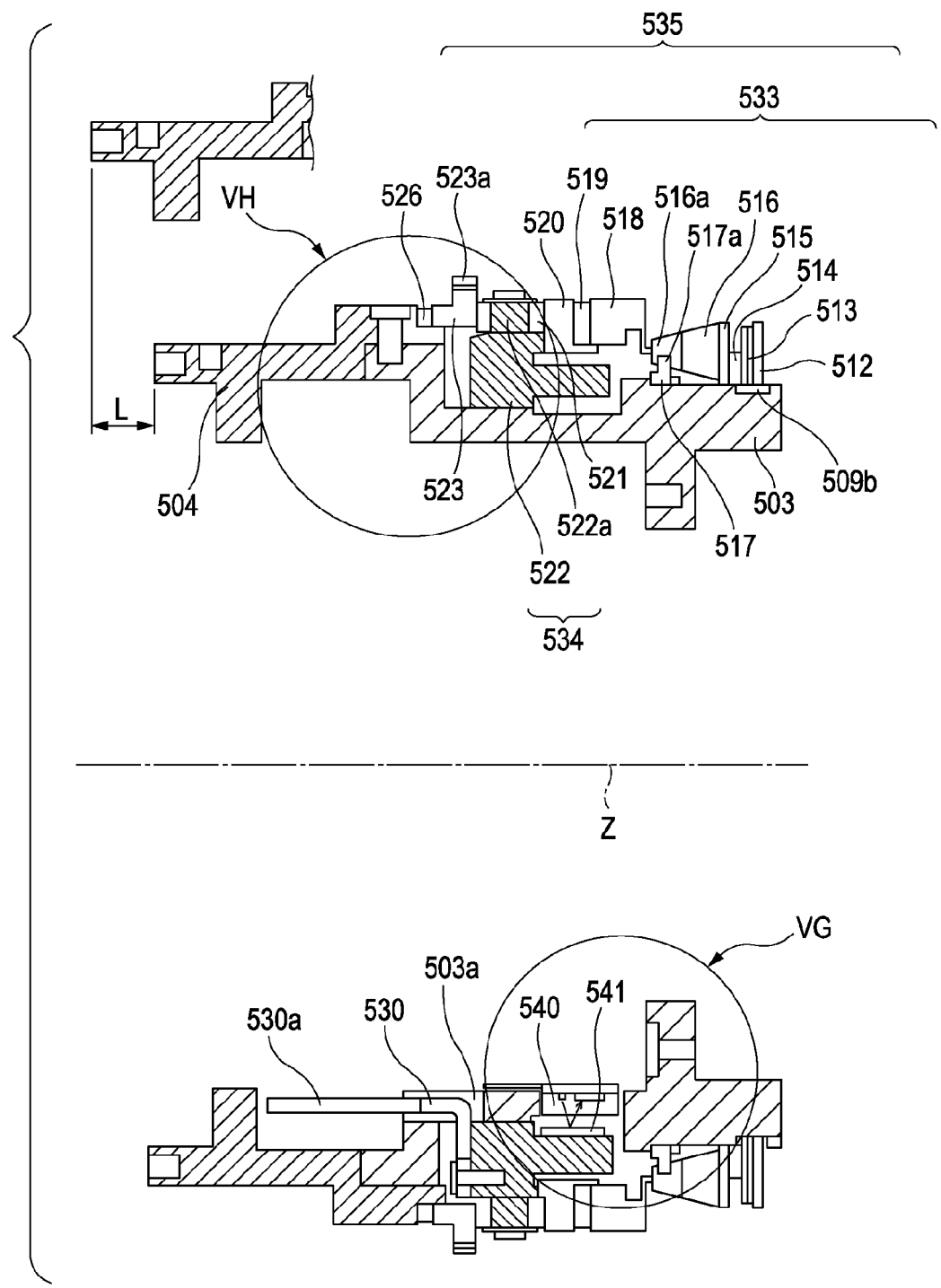
FIG. 16 is an enlarged view of principal parts according to the fourth exemplary embodiment of the present invention.
Figure 17A:
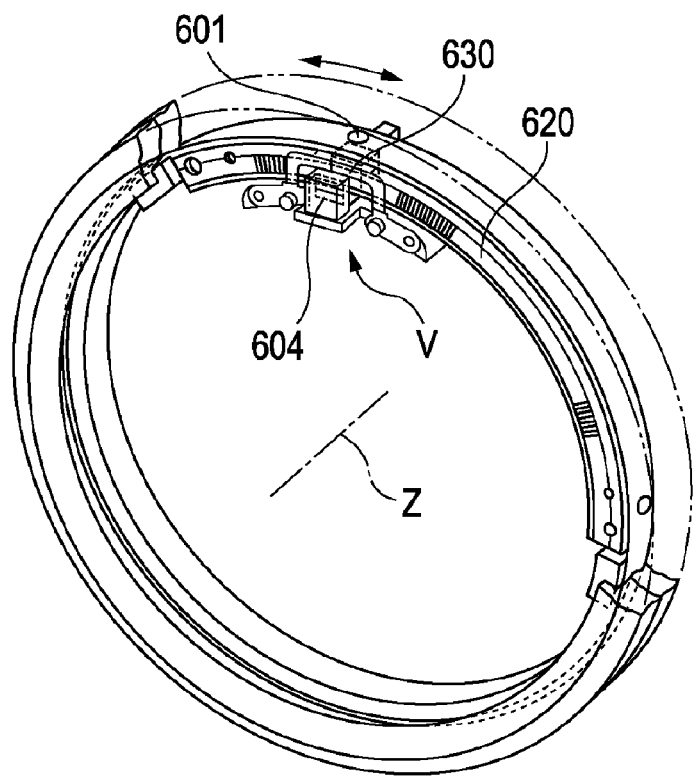
FIGS. 17A and 17B illustrate a conventional technology.
Figure 17B:
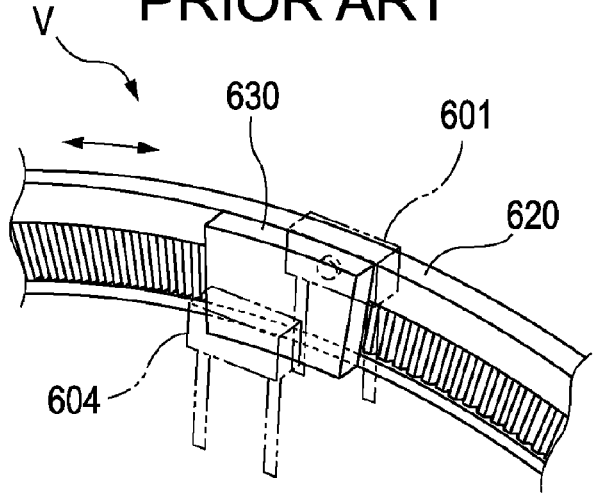

FIG. 15 is a cross-sectional view of a driving-force generating unit 535 incorporated in the lens barrel shown in FIG. 14, and FIG. 16 is a cross-sectional view of the unit 535 including a sensor and a reflective scale according to the present invention.

FIG. 14 illustrate an outer cylinder 501 of the lens barrel, a fixed cylinder 502 disposed inside the outer cylinder 501 and fixed to a mount using screws, and fixed cylinders 503 and 504 serving as a frame or a base plate of the driving-force generating unit 535.

The fixed cylinder 504 is fixed to the fixed cylinder 503 using screws, and the fixed cylinder 503 is fixed to the fixed cylinder 502 using screws.

A fixed cylinder 505 is disposed in the anterior position of the outer cylinder 501, and fixed to the fixed cylinders 503 and 504 using screws. The fixed cylinder 505 includes an outer cylindrical portion 505a in which a cam is formed, and an inner cylindrical portion 505b located inside the fixed cylinders 503 and 504.

A manual operation ring 506 is fitted into grooves (cam) formed in the outer circumferential surface of the outer cylindrical portion 505a of the fixed cylinder 505 in the circumference direction and into grooves formed in the outer circumferential surface of the outer cylinder 501 in the circumference direction so as to be rotatable about a central axis of the lens, i.e., an optical axis Z.

The manual operation ring 506 that is also movable in the optical-axis direction generates a tactile sensation using claws 501a of the outer cylinder 501 and grooves 506b formed in the inner circumferential surface of the manual operation ring 506 when the manual operation ring 506 is moved in the optical-axis direction, and retains the position after the movement in the optical-axis direction using the claws 501a and the grooves 506b.

As shown in FIG. 15, components 512 to 519 of an oscillatory-wave motor 533, a rotatable cylinder 520 that rotates in conjunction with a rotor 518 of the oscillatory-wave motor 533 in an integrated manner, a roller ring 534 serving as a bearing of the motor and an output member that is in contact with the rotatable cylinder 520, and a manual input ring 523 for inputting torque to the manual operation ring 506 are disposed on the outer circumferential surface of the fixed cylinder 503.

A main scale (pulse plate) 524 of an optical encoder according to the conventional technology is connected to the roller ring 534.

In FIG. 15, a photointerrupter 525 outputs signals according to the angular position of the pulse plate 524 to a lens CPU. A driving key 530 of a lens holder 532 is fixed to a ring 522 using screws.

The driving key 530 is fitted into a hole 503a formed in the fixed cylinder 503, and a roller 529 (not shown) fixed to the lens holder 532 is fitted into a groove 530a formed in the driving key 530.

Next, operations of the lens barrel having the above-described structure according to this exemplary embodiment will be described.

First, when operators of the lens barrel attempt to drive the lens holder 532 using the oscillatory-wave motor 533, they operate a focusing switch (not shown) for autofocusing or rotate the manual operation ring 506.

When the focusing switch is operated, a controlling circuit (not shown) is driven so as to apply voltage to an electrostrictive element 515.

As a result, vibration that progresses in the circumferential direction is generated in a stator 516, and the rotor 518, a rubber ring 519, and the rotatable cylinder 520 are rotated about the optical axis Z according to the vibration of the stator 516.

In response to the rotation of these components, a hollow roller 521 receives torque from the rotatable cylinder 520. However, the manual input ring 523 is not rotated due to the friction of a friction ring 526. Therefore, the hollow roller 521 is rolled along the end surface of the manual input ring 523 while being rotated about a roller-supporting axis 522a.

The ring 522 is rotated about the optical axis Z via the roller-supporting axis 522a.

The lens holder 532 is moved in the optical-axis direction along the outer cylindrical portion 505a in which the cam is formed while being rotated about the optical axis Z by the driving key 530. In this manner, the focus is automatically adjusted.

The structure of the conventional transmissive encoder in a circled area VE shown in FIG. 15 will now be described.

The photointerrupter 525 and the pulse plate 524 are disposed as shown in the drawing such that the rotational angle of the pulse plate 524 is detected.

Workability of assembling the photointerrupter 525 is poor since the angular U-shaped photointerrupter 525 has to be inserted from the inside of the lens barrel.

Moreover, degree of flexibility in layout is low since the dimension of the photointerrupter 525 in the direction of the optical axis Z is large. Therefore, this encoder cannot be included in the driving-force generating unit 535 in the optical-axis direction as shown in FIG. 15.

If the encoder is disposed in a space between the fixed cylinder 503 and the rotor 518 in a circled area VF in FIG. 15, the dimension of the lens barrel in the optical-axis direction can be significantly reduced.

The length L to be reduced is shown in FIG. 16.

FIG. 16 illustrates the sensor and the reflective scale according to the present invention installed in a circled area VG (corresponding to the circled area VF shown in FIG. 15).

A detecting sensor 540 and a reflective scale 541 are disposed as shown in the circled area VG in FIG. 16.

The reflective scale film 541 is fixed to the inner surface of the roller ring 534 using a double-sided adhesive tape. The thickness of the reflective scale is approximately 0.3 mm.

On the other hand, the detecting sensor 540 mounted on a flexible substrate is disposed at a position at which a part of the fixed cylinder 503 is cut off.

The thickness of the detecting sensor is approximately 1.56 mm, and the gap between the reflective scale 541 and the detecting sensor 540 is approximately 0.85 mm.

The total thickness of the sensor-mounted portion in the radial direction is 0.3+1.56+0.85=2.71 mm, which is less than or equal to the dimension in the radial direction of 5 mm.

In this exemplary embodiment, the fundamental detection pitch of the detecting sensor 540 (pitch P of light-receiving elements) is 128 μm.

The reflective scale 541 is bonded to a part of the inner surface of the roller ring 534 having a diameter of 60.9 mm.

Coordinates (x, y) of a reflective point, at which the sum of an optical path length L1 between a light source and the reflective scale and an optical path length L2 between the reflective scale and a light-receiving surface is minimized, is determined using Expression 1 according to the present invention. The substantial position of reflection on the reflective scale film in the thickness direction, the optical thickness of the film, the optical path length in the detecting sensor, can be considered.

$$f[x, y] = \sqrt{x^2 + (G - R + \sqrt{R^2 - x^2})^2 + y^2} + \sqrt{(x - P)^2 + (G - R + \sqrt{R^2 - x^2})^2 + (y - Ds)^2}$$

[Expression 1]

Under the condition where the detecting sensor is disposed inside the cylinder, the corrected pitch of the reflective scale is determined as 134 μm with consideration of the designed gap.

Analog signals having a period of 134 μm are electrically divided into 32 in the lens, and a resolution of 134/32≈4.2 μm is finally obtained.

The ultrasmall reflection detecting sensor and the reflective scale film according to the present invention can be installed in a narrow space. Thus, an ultrasmall yet high-resolution high-precision optical encoder can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-247669 filed Aug. 29, 2005, which is hereby incorporated by reference herein in its entirety.

What is claimed is:

1. An optical encoder comprising:
a curved reflective scale that has a stripe pattern with a certain pitch;
a light source configured to irradiate the reflective scale with divergent light beams; and
a plurality of light-receiving elements configured to receive the light beams reflected by the reflective scale, the light-receiving elements having a certain pitch, wherein
the distance between the reflective scale and the light source is substantially equal to the distance between the reflective scale and a light-receiving surface of the light-receiving elements, and wherein
when a center of curvature of the reflective scale lies on the same side of the reflective scale as the light source and the light-receiving elements, the pitch P of the light-receiving elements and the pitch Ps of the stripe pattern of the reflective scale have the following relationship:

P<2×Ps.

2. An optical encoder comprising:
a curved reflective scale that has a stripe pattern with a certain pitch;
a light source configured to irradiate the reflective scale with divergent light beams; and
a plurality of light-receiving elements configured to receive the light beams reflected by the reflective scale, the light-receiving elements having a certain pitch, wherein
the distance between the reflective scale and the light source is substantially equal to the distance between the reflective scale and a light-receiving surface of the light-receiving elements, and wherein
when a center of curvature of the reflective scale lies on a side of the reflective scale opposite to that on which the light source and the light-receiving elements lie, the pitch P of the light-receiving elements and the pitch Ps of the stripe pattern of the reflective scale have the following relationship:

P>2×Ps.

3. An optical rotary encoder comprising:
a curved reflective scale that has a stripe pattern with a certain pitch;
a light source configured to irradiate the reflective scale with divergent light beams; and
a plurality of light-receiving elements configured to receive the light beams reflected by the reflective scale, the light-receiving elements having a certain pitch, wherein
the pitch of the reflective scale is set on the basis of an x coordinate at which the value of the following expression f(x, y) is minimized:

$$f[x, y] = \sqrt{x^2 + \left(G - R + \sqrt{R^2 - x^2}\right)^2 + y^2} + \sqrt{(-P+x)^2 + \left(G - R + \sqrt{R^2 - x^2}\right)^2 + (-Ds+y)^2}$$

where
x, y, z: coordinates on the reflective surface of the reflective scale;
R: radius of the reflective scale;
G: distance between the light source and the reflective surface of the reflective scale;
Ds: distance between the center of the light emission and the center of the light-receiving area; and
P: pitch of the light-receiving elements.

4. The optical rotary encoder according to claim 3, wherein the reflective scale is composed of a flexible material.

5. The optical rotary encoder according to claim 3, wherein the light source is a semiconductor laser.

6. An optical apparatus comprising the optical rotary encoder according to claim 3.

* * * * *